(12) United States Patent
Koelewijn et al.

(10) Patent No.: US 10,686,950 B2
(45) Date of Patent: Jun. 16, 2020

(54) SYSTEM FOR DISTRIBUTING IMAGE SCANNING TASKS TO NETWORKED DEVICES

(71) Applicant: Y Soft Scanning Solutions s.r.o., Brno (CZ)

(72) Inventors: Wouter Koelewijn, Putten (NL); Ondřej Krajíček, Brno (CZ); Miroslav Sova, Trutnov (CZ); Jakub Šlesarik, Miškovice (CZ)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 16/364,589

(22) Filed: Mar. 26, 2019

(65) Prior Publication Data

US 2019/0222701 A1 Jul. 18, 2019

Related U.S. Application Data

(63) Continuation of application No. 15/825,238, filed on Nov. 29, 2017, now Pat. No. 10,284,733.
(Continued)

(51) Int. Cl.
*H04N 1/00* (2006.01)
*H04N 1/32* (2006.01)
(Continued)

(52) U.S. Cl.
CPC ......... *H04N 1/00241* (2013.01); *G06F 21/31* (2013.01); *G06F 21/608* (2013.01); *G06Q 10/06311* (2013.01); *H04N 1/00244* (2013.01); *H04N 1/00251* (2013.01); *H04N 1/00307* (2013.01); *H04N 1/2187* (2013.01); *H04N 1/32085* (2013.01); *H04N 1/32512* (2013.01); *H04N 1/32545* (2013.01);
(Continued)

(58) Field of Classification Search
CPC ..... G06F 21/31; G06F 21/608; G06K 9/6202; G06Q 10/06311; H04M 1/72527; H04N 1/00241; H04N 1/00244; H04N 1/00251; H04N 1/00307; H04N 1/2187; H04N 1/32085; H04N 1/32512; H04N 1/32545; H04N 1/4406; H04N 1/4413; H04N 2201/0039; H04N 2201/0081; H04N 2201/0094; H04N 1/00344; H04N 2201/3208; H04N 2201/3278
USPC ........................................ 358/1, 15, 442, 443
See application file for complete search history.

(56) References Cited

U.S. PATENT DOCUMENTS 8,437,016 B2 5/2013 Takahashi
9,092,181 B2 * 7/2015 Selvaraj ................ G06F 3/1257
(Continued)

OTHER PUBLICATIONS

Written Opinion and International Search Report; corresponding PCT Application No. PCT/IB2017/057504; filed Nov. 29, 2017; Authorized Officer Julien Thollot; dated Feb. 22, 2018.

*Primary Examiner* — Negussie Worku
(74) *Attorney, Agent, or Firm* — Squire Patton Boggs (US) LLP

(57) ABSTRACT

A scanning network includes a central server configured to distribute a scan task. The scan task is associated with a scanning of an identified document. The scanning network further includes a plurality of imaging devices configured to receive and execute a scan task and a storage database configured to receive a document image created from execution of a scan task.

19 Claims, 9 Drawing Sheets

Related U.S. Application Data

(60) Provisional application No. 62/427,434, filed on Nov. 29, 2016.

(51) Int. Cl.
  H04N 1/21 (2006.01)
  G06F 21/60 (2013.01)
  H04M 1/725 (2006.01)
  G06Q 10/06 (2012.01)
  H04N 1/44 (2006.01)
  G06F 21/31 (2013.01)
  G06K 9/62 (2006.01)

(52) U.S. Cl.
  CPC ......... H04N 1/4413 (2013.01); *G06K 9/6202* (2013.01); *H04M 1/72527* (2013.01); *H04N 1/4406* (2013.01); *H04N 2201/0039* (2013.01); *H04N 2201/0081* (2013.01); *H04N 2201/0094* (2013.01)

(56) References Cited

U.S. PATENT DOCUMENTS

| | | | |
|---|---|---|---|
| 10,171,688 B2 * | 1/2019 | Jang | H04N 1/00244 |
| 10,284,733 B2 * | 5/2019 | Koelewijn | G06F 21/608 |
| 2006/0256392 A1 | 11/2006 | Van Hoof et al. | |
| 2007/0258116 A1 | 11/2007 | Matsumoto | |
| 2007/0263262 A1 * | 11/2007 | Hayashi | H04N 1/00222 358/474 |
| 2008/0079985 A1 * | 4/2008 | Ferlitsch | H04N 1/00222 358/1.15 |
| 2008/0252922 A1 | 10/2008 | Ikegami | |
| 2009/0052751 A1 | 2/2009 | Chaney et al. | |
| 2010/0177341 A1 * | 7/2010 | Mihara | H04N 1/0035 358/1.15 |
| 2010/0195152 A1 | 8/2010 | Tokumaru | |
| 2011/0211227 A1 * | 9/2011 | Sato | H04N 1/00952 358/1.15 |
| 2011/0279859 A1 * | 11/2011 | Hashimoto | H04N 1/00344 358/1.15 |
| 2013/0024913 A1 * | 1/2013 | Lim | G06F 3/1204 726/4 |
| 2013/0063771 A1 | 3/2013 | Song | |
| 2013/0067027 A1 | 3/2013 | Song | |
| 2013/0120780 A1 * | 5/2013 | Hamada | G06F 3/1288 358/1.13 |
| 2013/0132716 A1 * | 5/2013 | Morita | G06F 21/606 713/155 |
| 2013/0208296 A1 * | 8/2013 | Yoshida | H04N 1/0048 358/1.14 |
| 2014/0253933 A1 | 9/2014 | Selvaraj et al. | |
| 2015/0092221 A1 * | 4/2015 | Ochi | G06F 3/1206 358/1.14 |
| 2016/0006901 A1 * | 1/2016 | Torigoshi | H04N 1/32771 358/1.15 |
| 2016/0156807 A1 | 6/2016 | Tanaka | |
| 2016/0323472 A1 * | 11/2016 | Nakashima | H04N 1/00938 |
| 2017/0048416 A1 | 2/2017 | Cho | |
| 2017/0134609 A1 | 5/2017 | Park | |
| 2017/0206044 A1 * | 7/2017 | Kim | G06F 3/1242 |
| 2017/0214808 A1 | 7/2017 | Yun | |
| 2017/0244859 A1 * | 8/2017 | Yamada | H04N 1/00339 |
| 2017/0286035 A1 * | 10/2017 | Miyahara | G06F 3/1236 |
| 2018/0063352 A1 * | 3/2018 | Yasuhara | H04N 1/00042 |
| 2018/0101345 A1 * | 4/2018 | Nagata | G06F 3/1205 |
| 2019/0065127 A1 * | 2/2019 | Wagatsuma | G03G 15/602 |
| 2019/0104210 A1 * | 4/2019 | Patton | A61B 3/0025 |

* cited by examiner

Scan passport of Mr. Bose
John Doe
Billing code: UX team

Scan task settings
Scan settings

Banking back-end system task ID: 38756

Passport number: 34263718

Country of origin: Select country >

Scan

FIG. 8

SYSTEM FOR DISTRIBUTING IMAGE SCANNING TASKS TO NETWORKED DEVICES

CROSS REFERENCE TO RELATED APPLICATION

This application claims priority to U.S. patent application Ser. No. 15/825,238 filed on Nov. 29, 2017, which in turn claims the benefit of U.S. Provisional Patent Application No. 62/427,434, filed on Nov. 29, 2016. The disclosures of both applications are incorporated by reference herein, in their entirety.

FIELD OF INVENTION

The present disclosure relates to a system and a method for providing scan tasks and notifications to selected users. More particularly, the present disclosure relates to a system and method for providing discrete, customized scan tasks and notifications to selected users, which can then be performed on any one of a plurality of networked devices.

BACKGROUND

Documents, photographs, and other items may be scanned or imaged by a dedicated scanner or a multi-function device ("MFD") that has scanning functionality as well as at least one other capability, such as copying, printing, and faxing. In a business environment it is frequently necessary to scan and file various documents including invoices, personal identification, forms, receipts, records, pay slips, travel tickets, and reports, for example. Scanning these documents and saving them to the correct locations is important for record keeping and other business functions, such as employee compensation or benefits. Current technical solutions require several manual steps to fulfil these tasks, not actually prohibit it.

Three issues often arise when an entity within the company needs a scanned document: 1) the requesting entity cannot easily identify or locate the appropriate employee to request a document scan; 2) the appropriate employee does not know the proper formatting and destination parameters for the scan or, even if they know, they need to input these parameters manually which is burdensome and error-prone; and 3) the employee cannot locate a specific imaging device that is capable of completing the task involving scanning a document, and which the employee knows how to operate. In environments such as this, where multiple imaging devices and employees are distributed in various physical locations, obtaining needed documents is inefficient and can lead to inaccurate record keeping. Thus, a need exists for a system that can efficiently identify and notify an employee that a scan of a document is needed, and which allows the employee to quickly complete the scan at any appropriate scanner with a pre-programmed scan task.

FIG. 1 shows a prior art scanning system 100. To scan an item, a user 110 physically approaches a scanner or MFD 120 and chooses scan settings that are appropriate for the specific document. For example, the user may identify the size of the item to be scanned, select a scan resolution, select color, grayscale, or black-and-white settings, and selecting the image file type (e.g., .pdf, .gif, .jpg, etc.). The user may also select a scan destination 130. Example scan destinations include sending the scanned image to a server or other computer, emailing the scanned image, or sending the scanned image to cloud-based storage. Cloud-based storage may be provided by a third-party provider, such as OPEN TEXT EDOCS, DROPBOX, IFS, OFFICE 365, SAP, or other providers. Destinations may also include other systems and applications without storage capabilities.

SUMMARY

In one embodiment, a computer readable medium with a computer executable instruction performing the step of defining a scan task for execution by a user on one of a plurality of imaging devices. The scan task includes scan settings and destination settings. The computer executable instructions also perform the steps of identifying a particular document for scanning and distributing the scan task to each of the plurality of imaging devices upon identifying the particular document for scanning. The computer executable instructions also perform a step of creating a digital image of a scanned document at one of the plurality of imaging devices according to the scan settings.

In another embodiment a scanning network includes a central server configured to distribute a scan task. The scan task is associated with a scanning of an identified document. The scanning network further includes a plurality of imaging devices configured to receive and execute a scan task and a storage database configured to receive a document image created from execution of a scan task.

In yet another embodiment, a method for creating and executing a scan task for a document includes creating a scan task. The scan task includes scan settings and a scan destination, and the scan task is associated with an identified document. The method also includes sending the scan task to a user device, receiving a scanned document as a result of a user executing the scan task at the user device according to the scan settings, and saving the scanned document to the scan destination.

BRIEF DESCRIPTION OF DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

FIG. 8 illustrates an exemplary display of a user interface for performing the specific task of scanning a passport for a specific user;

DETAILED DESCRIPTION

Figure 1:
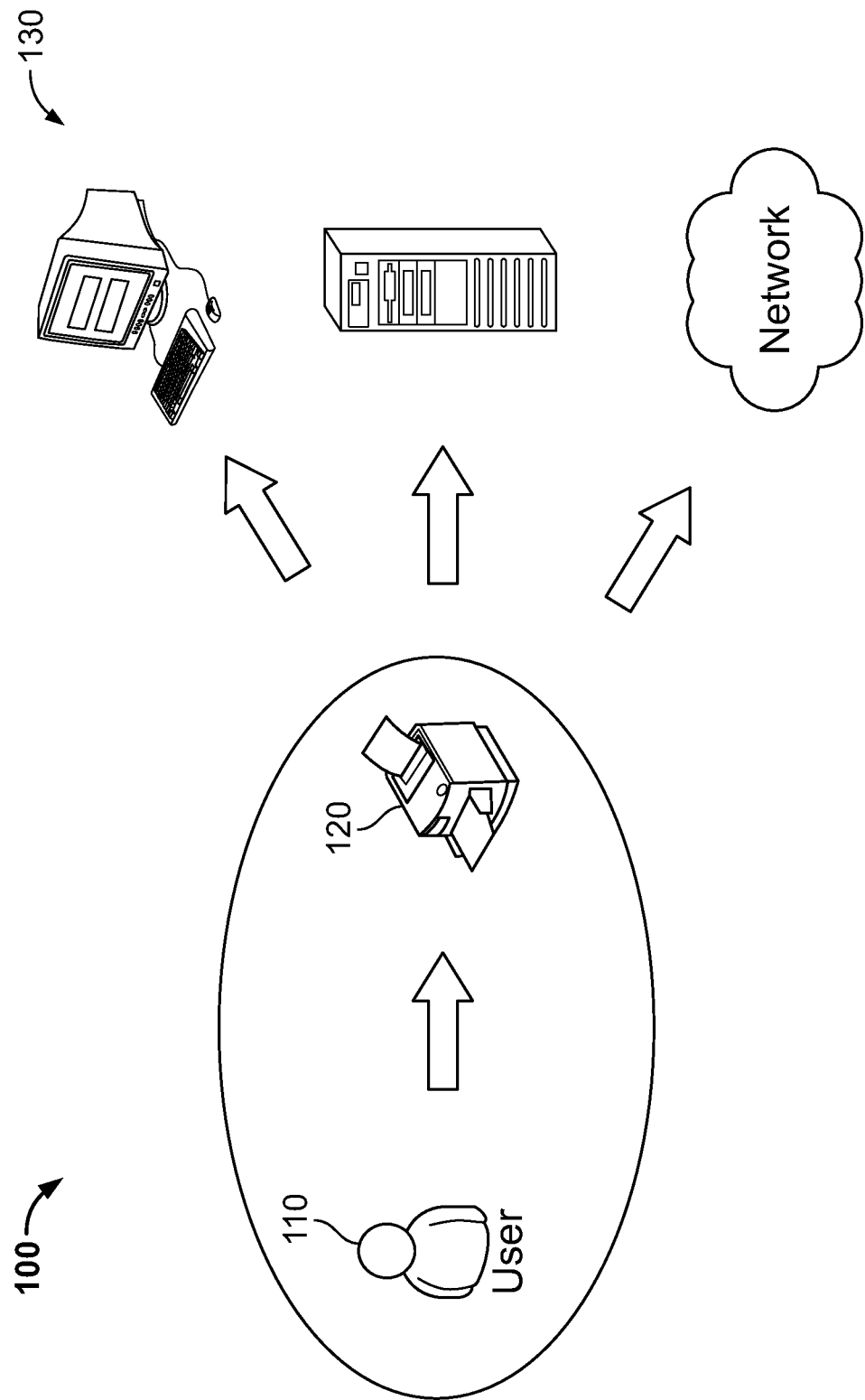
FIG. 1 is a schematic drawing illustrating a prior art scanning system.

FIG. 1 is a schematic drawing illustrating a prior art scanning system, described above.

Figure 2:
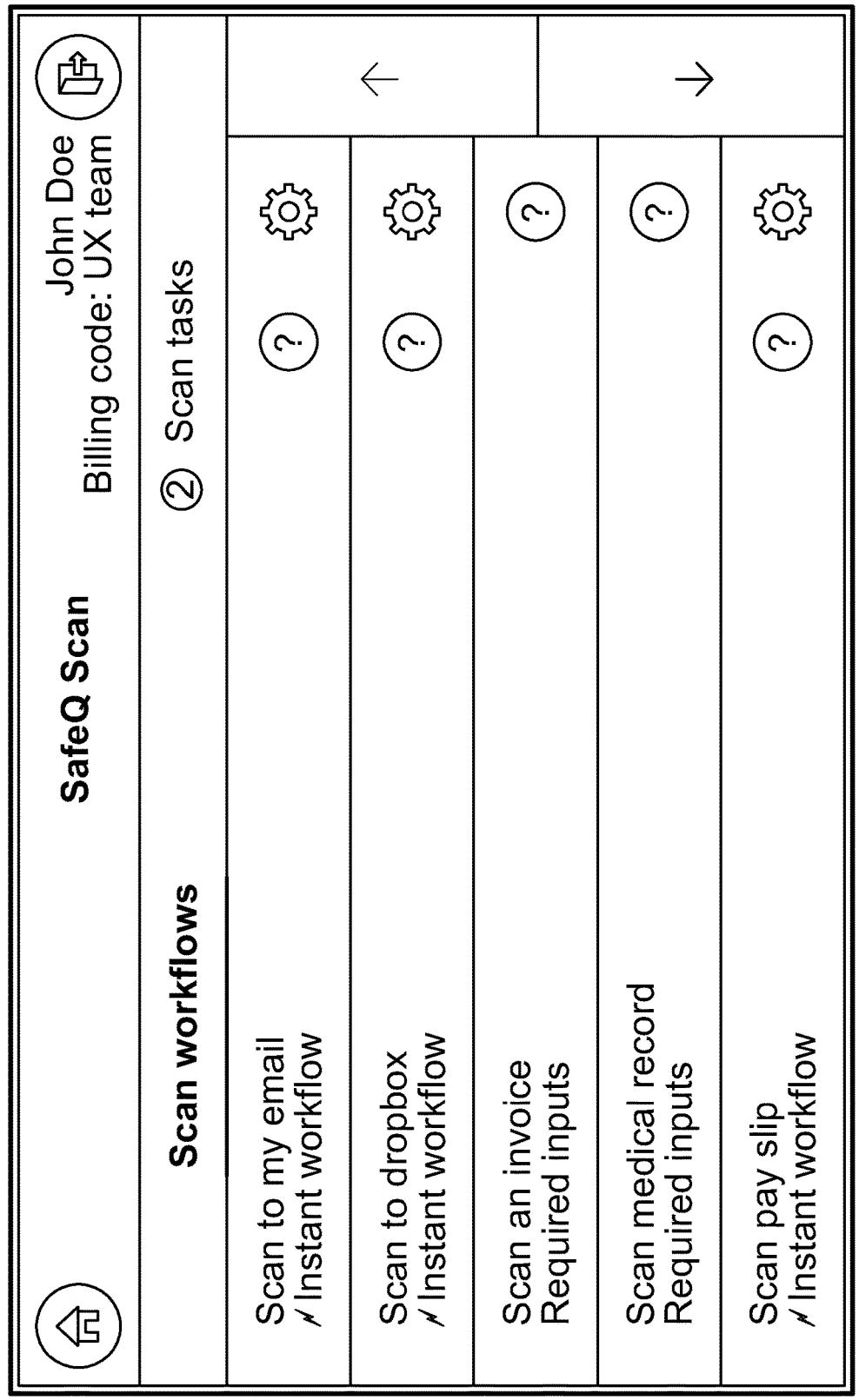
FIG. 2 illustrates an exemplary display of scan workflows.

FIG. 2 illustrates an exemplary display 200 of scan workflows. A scan workflow represents general settings that may be used regularly. For example, a scan workflow may identify a scan destination, such as "scan to my email" or "scan to dropbox." Additionally, or in the alternative, a scan workflow may include scan settings that are suitable for a particular document type. For example, a scan workflow such as "scan an invoice," "scan medical record," or "scan pay slip" may include settings for document size, image resolution, and a selection of color or black-and-white scanning, so that a user does not need to manually make such selections. It should be understood that the term "scanning," as used commonly in the art and in this disclosure, is not limited to scanning by traditional flatbed scanners, but broadly includes any type of imaging that may be performed by devices, including without limitation, flatbed scanners, drum scanners, MFDs, copiers, film scanners, roller scanners, 3D scanners, planetary scanners, hand scanners, barcode scanners, QR code scanners, laser scanners, CT scanners, optical readers, and portable scanners, as well as other imaging devices such as cameras, including standalone cameras and cameras in or on devices such as mobile phones, tablets, computers, and smart boxes.

Figure 3:
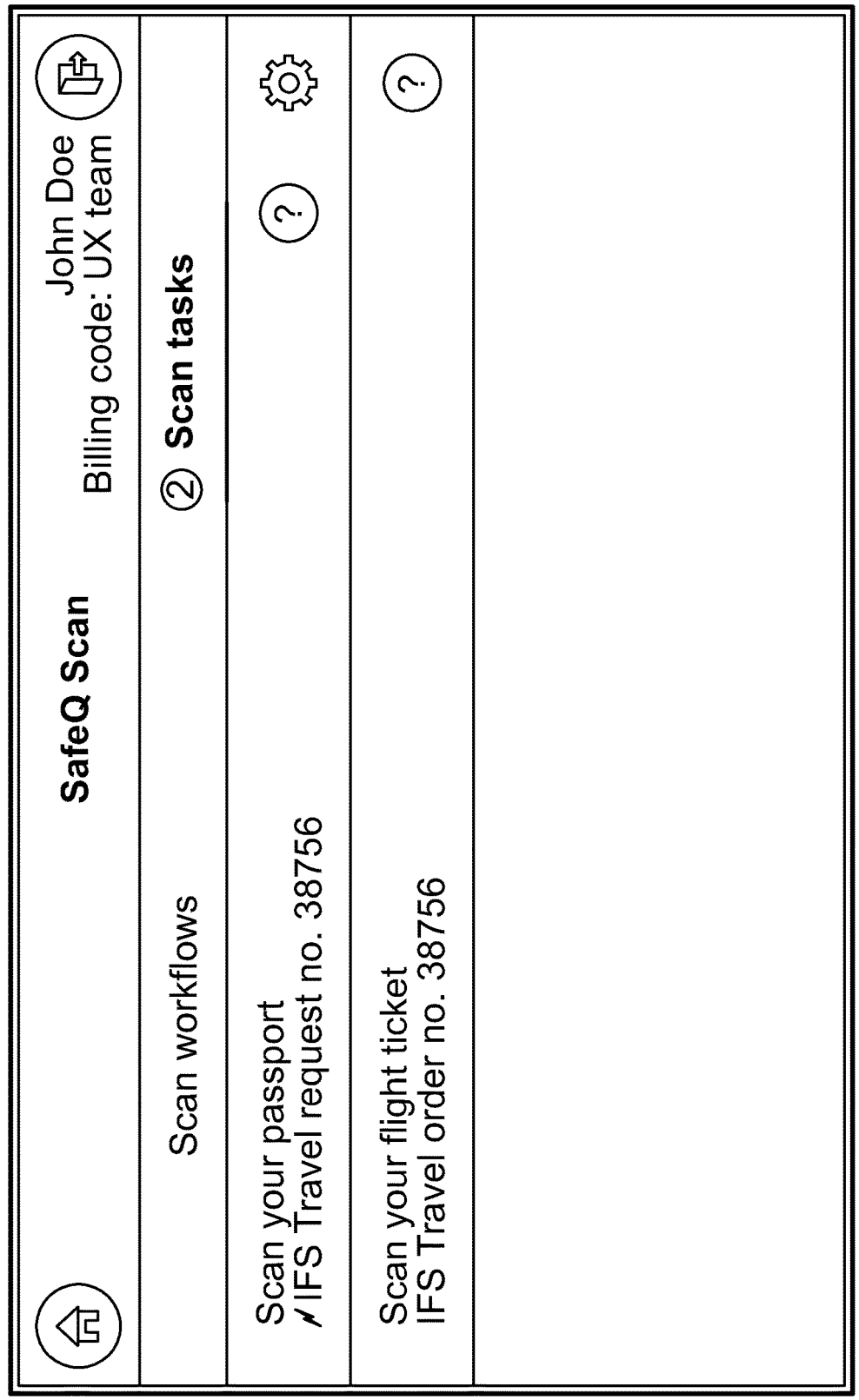
FIG. 3 illustrates an exemplary display of scan tasks.

FIG. 3 illustrates an exemplary display 300 of scan tasks. Unlike the scan workflows described above, a scan task is customized for a particular user and identifies a particular item to be scanned. The scan task includes both scan settings and destination settings. In the illustrated example, John Doe is an employee who submits a travel request to an HR department for approval. During a review process, the HR department determines that it needs to review a passport and a flight ticket. A scan task is created specifically for John Doe for a scan of a passport and a scan of a flight ticket. In this embodiment, the scan task is created on a computer at a central server location. The "scan your passport" scan task is pre-programmed with scan settings for a passport and the desired scan destination. Likewise, the "scan your flight ticket" scan task is pre-programmed with scan settings for a flight ticket and the desired scan destination. In alternative embodiments (not shown) the scan task can be created by an external system which requires an electronical copy (done on imaging device) as a part of its processes. Such a scan task is then executed on an imaging device.

After the scan task is created, the scan task is distributed to a plurality of imaging devices on the network. Distribution computer code located on the central computer determines where to send the scan task. The scan task may be sent to all imaging devices that are accessible to a particular user, and only to imaging devices that are capable of executing the scan task according to the scan settings and distribution settings. In one embodiment, the imaging device requests scan tasks from the system. In such an embodiment, the imaging device may request scan tasks for a specific user at the time the user logs into the imaging device. Alternatively, the imaging device may periodically request scan tasks, or request scan tasks in response to another prompt. In an alternative embodiment, the scan task is pushed out to the imaging devices. In such an embodiment, the scan task may be pushed out the imaging devices at the time it is created or at predetermined intervals.

A notification is also sent to the user. The notification may be sent by email, text message, or through a notification on a mobile application. Alternatively, the notification may be sent through any communication means, including to the imaging devices themselves.

A user then logs into an imaging device on the network. In one embodiment, the user may log into any imaging device on the network. In an alternative embodiment, access to some imaging devices may be restricted, such that a specific user may only be authorized to log into a specific imaging device or specific imaging devices. The user may log in by entering a user name and/or a password. Alternatively, the user may log in by swiping a card, scanning a bar code, or by using another identification device. Credential verification code located on the imaging device permits the user to log into the imaging device.

The network may include imaging devices that are capable of being programmed to receive scan tasks and display the scan tasks to a user in a desired manner. The network may also include imaging devices that are not capable of being programmed in such a manner. Such devices are connected to a separate terminal having a user interface. The separate terminal receives scan tasks and displays the scan tasks to the user in the desired manner. The user interfaces with the terminal and adjusts the scan task so that it is compatible with the imaging device, and the terminal then sends instructions to the imaging device.

After the user logs in, the user's custom scan tasks appear on a user interface. An access code stored on the imaging devices presents a user with the available scan tasks once the user logs into the imaging device. Because the scan tasks can be distributed to multiple imaging devices on the network, the scan tasks will appear on the user interface after the user has logged into any imaging device on the network that the user is authorized to use. The user then selects the appropriate scan task and scans the corresponding item. The pre-selected scan setting associated with the scan task may be displayed to the user. In some instances, the user is permitted to modify the scan settings if desired. In other instances, the pre-selected scan settings cannot be modified. The item is scanned at the pre-selected (or modified) scan settings, and the scanned image is sent to the pre-selected destination.

In one embodiment, the scan settings are optimized for each imaging device on the network. For example, some networks may include both older devices and newer devices. Some networks may include devices with advanced functionality and devices with only basic functionality. Some networks may include imaging devices built by different manufacturers. Where different devices are employed, each device may have a different optimal scan setting for a particular document. Therefore, a different scan setting may be provided for each device.

In one embodiment, the scan settings are pre-selected for a particular device. In another embodiment, the scan settings are dynamically adjusted after the user logs in to a specific device. After log in, a networked computer is notified of which device is being used and adjusts the scan settings.

In the above example, each scan task is a discrete scanning operation that is only required to be performed a single time. In such cases, the scan task is removed from all imaging devices upon completion. A central computer on the network includes removal code, and sends the removal code to each imaging device to remove scan tasks from the imaging devices after a scan task is executed. In an alternative device, the removal code may be generated and sent by an imaging device.

In one embodiment, a scan task notification may be sent to multiple people. Such a notification may be referred to as a one-to-many tasks, because one administrator sends a request to a group. In one example of a one-to-many task, every person who receives the notification is required to perform the scan task. For example, if a group of people will be traveling, everybody in the traveling group must scan their passport. In another example of a one-to-many task, the task must only be performed a single time. For example, a request to scan a patient's X-ray may be sent to a pool of administrative workers. After one person in the pool of administrative workers performs the scan task, the scan task does not need to be performed by any other person in the pool.

Figure 4:
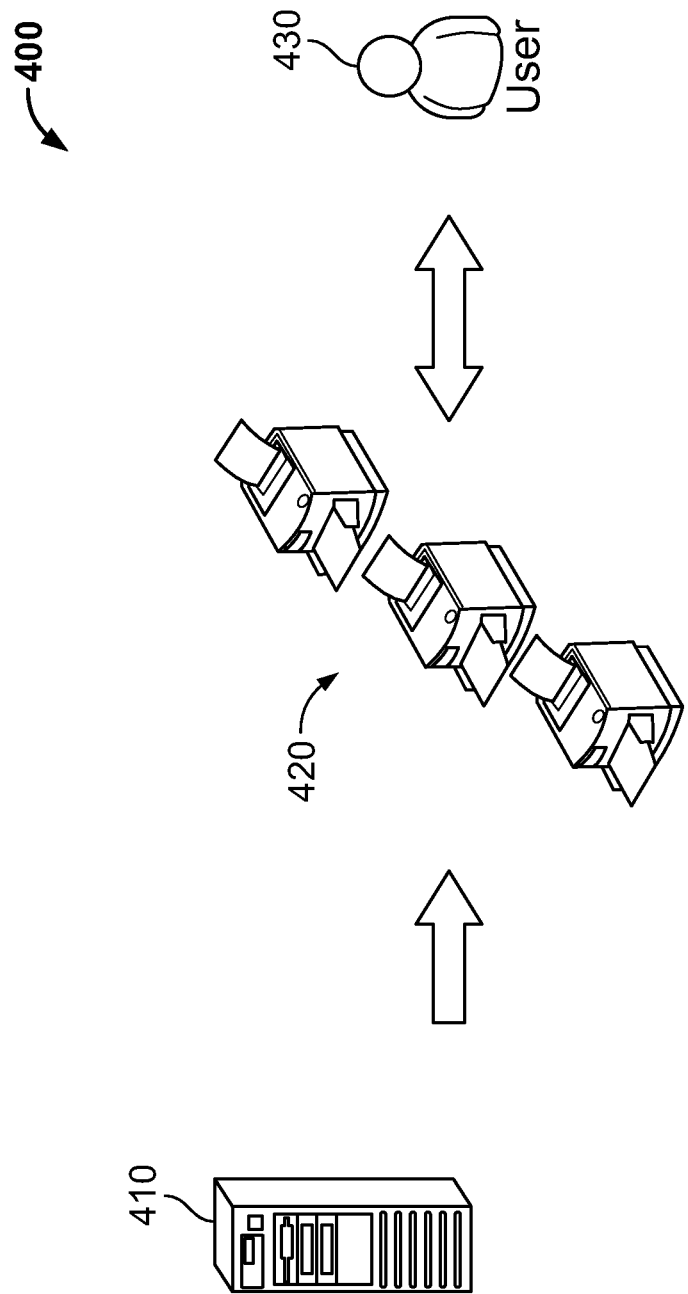
FIG. 4 is a schematic drawing illustrating one embodiment of a system for distributing scan tasks to a plurality of networked devices.

FIG. 4 is a schematic drawing illustrating one embodiment of a system 400 for distributing scan tasks to a plurality of networked imaging devices. In this embodiment, a third party application (such as a software program) 410 can be programmed to initiate a scan task and send the scan task to all networked imaging devices 420. For example, an inventory software program can be programmed to request a scan task of a specific form when a particular type of delivery is entered. A notification of the scan task is sent to selected users 430, either to the imaging devices themselves (for example, if the imaging device is a mobile phone) or to separate notification devices (such as a user's inbox, a mobile phone, tablet, etc.) and the scan task is sent to all available imaging devices. When a user arrives at an imaging device to execute the scan task, the scan task is already pre-loaded so that the user does not have to enter scan settings or destination settings manually. However, in some instances the user may have the option of changing the settings. A user can then execute the scan task at an imaging device, and the created document image is sent to the destination location. Execution code located on the imaging device creates a document image based on the scan settings defined in the imaging device.

In one embodiment, after the user executes the scan task, the scanned document is validated against the required input. As one example, when the scan task relates to scanning a passport the system may use artificial intelligence (e.g., a classification engine) to optically recognize that a passport has been actually scanned and that the number of pages is correct etc. Additionally, validation may be performed by comparing pre-filled metadata to received data.

In another embodiment, after the user executes the scan task and the imaging device receives the document, a second notification is sent to selected users, either to the imaging devices themselves or to separate notification devices. The second notification may be a notification that the scan task is complete. Alternatively, the second notification may be a notification of a second scan task that requires receipt of the scanned document before the second scan task can be performed. For example, the first scan task may be to scan a particular document, and the second scan task may be to print a copy of the scanned document or to scan a related document.

After the user executes the scan task, the imaging device may be configured to further process the scanned image automatically. For example, the imaging device may perform an optical character recognition ("OCR") operation on a text document, optimize an image for printing, or compress a document for storage or transmission.

Once a user executes the scan task at one imaging device, that imaging device reports that the scan task has been completed. The report is sent to a central server. If the report is sent to a central server, the central server identifies all other imaging devices that have the scan task and instructs them to delete the scan task. In either case, the scan tasks are removed from all other imaging devices once the scan task is completed at one imaging device. The ability for a user to use any available imaging device to execute a pre-loaded scan task enhances the overall process of obtaining an image of a needed document. It enhances the functionality of all the imaging devices because the imaging devices and third party application work together in a distributed manner to facilitate the process. Further, the process is enhanced due to the interconnectivity of imaging devices (with either each other or with a central server) to remove scan tasks from all imaging devices once the scan task is completed at one imaging device. This prevents the same scan task from mistakenly being performed twice.

Figures 5, 6:
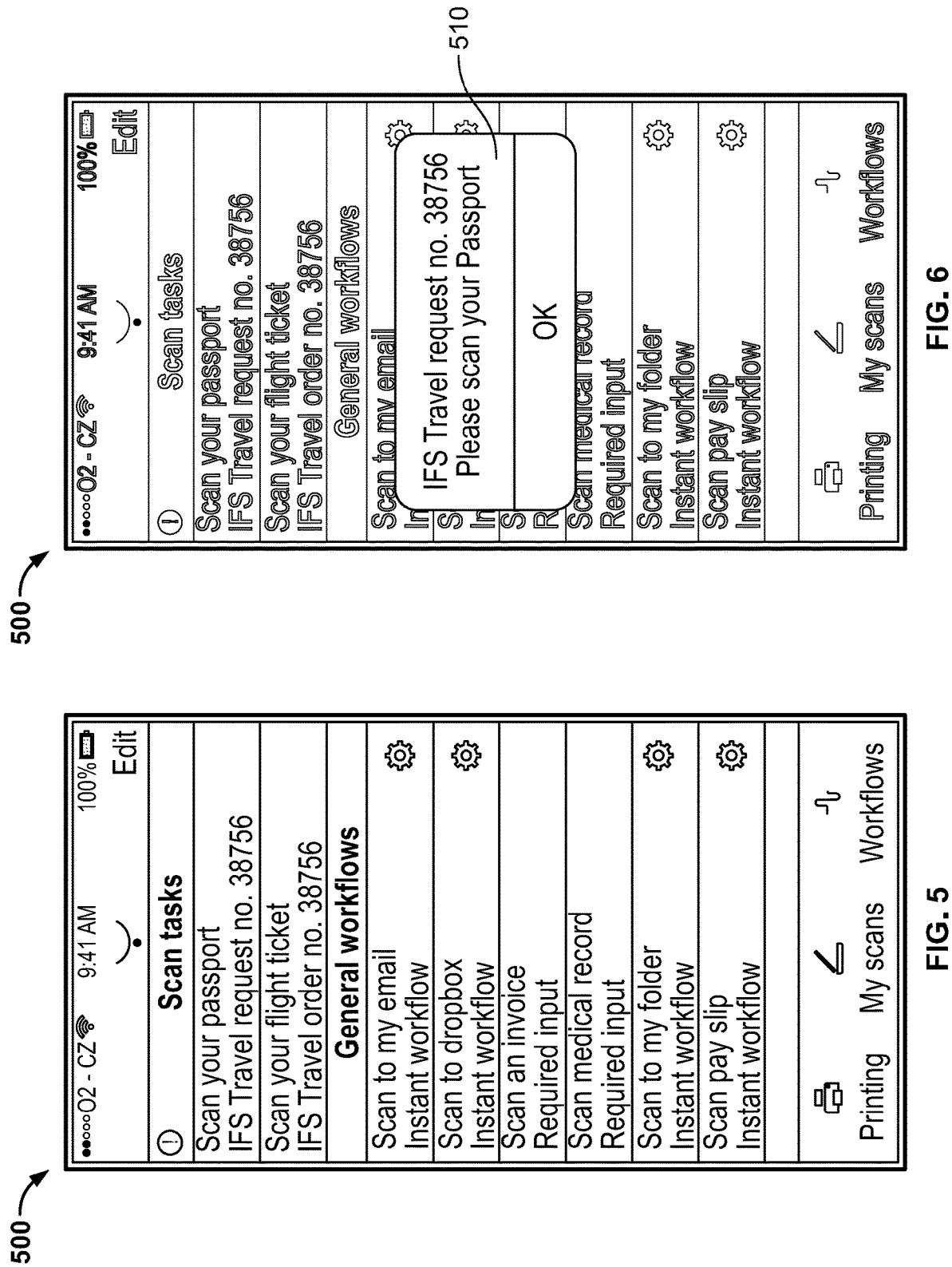
FIG. 5 illustrates an exemplary display of scan tasks and workflows on a mobile device.
FIG. 6 illustrates an exemplary notification of a scan request on a mobile device.

FIG. 5 illustrates an exemplary display 500 of scan tasks and workflows on a mobile device. Exemplary mobile devices include mobile telephones and tablets. Additionally, the scan tasks may be sent to a laptop or desktop computer having a camera or other imaging capabilities.

In one embodiment, the mobile device is part of the scanning network. The user may scan the desired document using the camera function of the device. As with the other imaging devices, the image is created using the pre-selected scan settings and is sent to a pre-selected destination. The scan settings of the scan task may be optimized for the particular mobile device that is being used. The scan settings may be pre-selected for the particular mobile device, or they may be dynamically adjusted after the user logs into the device. After log in, a networked computer is notified of which device is being used and adjusts the scan settings.

FIG. 6 illustrates an exemplary notification 510 of a scan request on the display 500 a mobile device. A user, upon receiving the scan task notification, can execute the scan with his mobile phone if appropriate, or can execute the scan at an MFD. The scan task automatically forwards the scanned document to an appropriate location. Once the scan is complete, the scan notifications and scan tasks are removed from the devices in the system.

Importantly, the scan task is initiated by software at a location remote from the imaging device, not at an imaging device. Additionally, an important aspect of the invention is the distribution of scan tasks and notifications to multiple devices in a system, and the removal of the scan tasks and notifications when the scan is completed at one of the devices.

Figure 7:
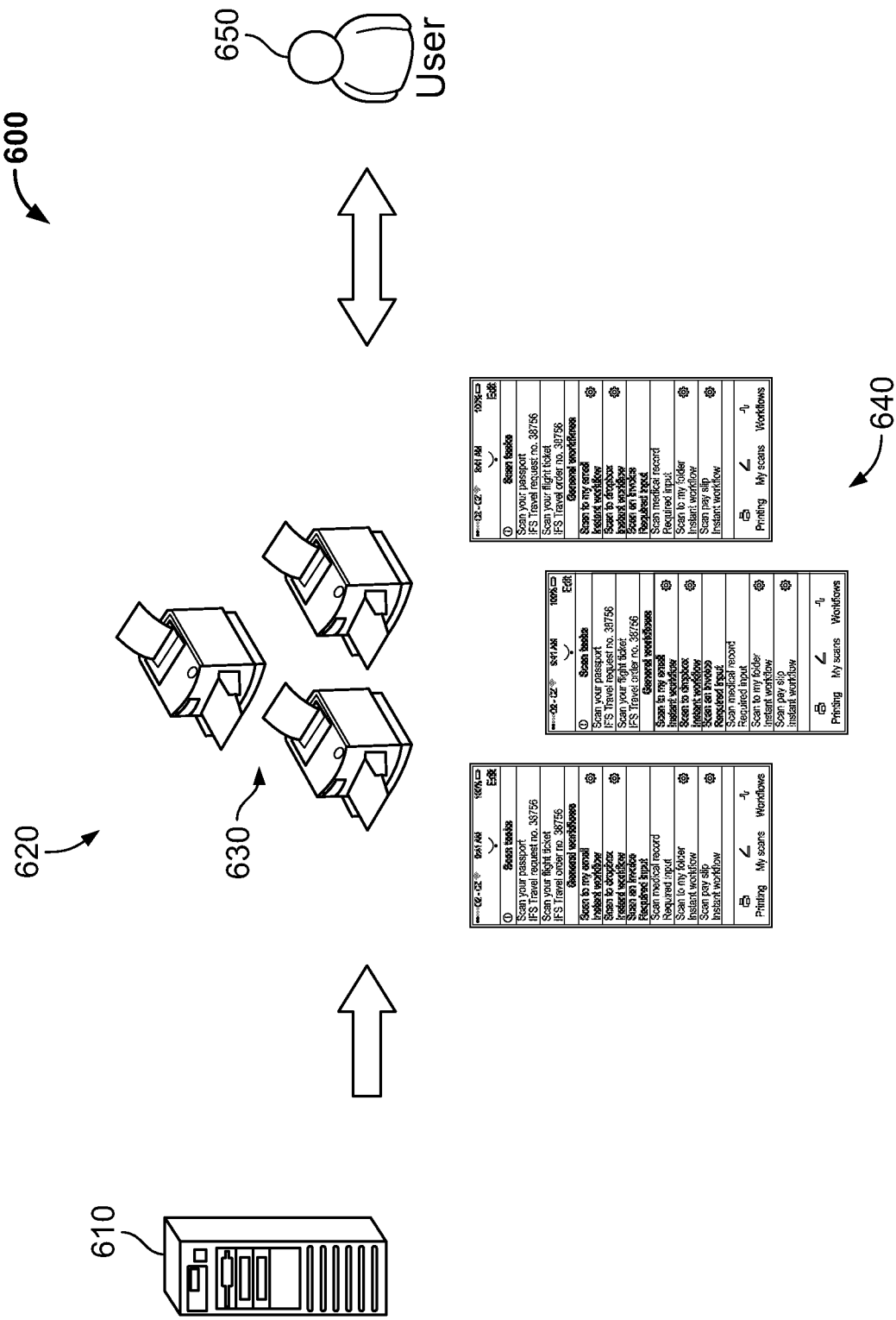
FIG. 7 is a schematic drawing illustrating another embodiment of a system for distributing scan tasks to a plurality of networked devices.

FIG. 7 is a schematic drawing illustrating another embodiment of a system for distributing scan tasks from an application 610 to a plurality of networked imaging devices 620. This figure more clearly depicts the use of both dedicated imaging devices, MFDs 630, and mobile devices 640. In this embodiment, a single user 650 might possess multiple of the above devices, all capable of receiving scan tasks. When a scan task requires action from a particular user, but the user's whereabouts is unknown, the scan task can be pushed to all of that user's devices so that the user may satisfy the scan task on any of his or her devices.

FIG. 8 illustrates an exemplary display of a user interface for performing the specific task of scanning a passport for a specific user. In the example shown in FIG. 8, a scan task has been created for a user identified as Mr. Bose. The scan task setting show the meta data fields that are required for the task of scanning a passport. In this example, the task requires an ID number, a passport number, and a country of origin. Some or all of the meta data fields may be pre-filled by the user or a third party operator, or the data may be automatically extracted from a database. In the illustrated embodiment, the ID number and the passport number fields have been pre-filled, but the user must select a country from a drop down menu. In one such embodiment, the user may alter the pre-filled fields if a correction is needed. In another embodiment, the user is prohibited from changing the pre-filled fields. Once all of the meta data fields have been completed and the user has placed the passport on the scanner (or positioned it in front of a camera of a phone or other device), the user touches the scan button to scan the passport.

In the FIG. 8 embodiment, additional functions can be performed by the system and displayed on a user interface. Examples of additional functions include the ability to schedule tasks for dates and times in the future, including recurring tasks that must be completed periodically. Additionally, the scan task may include document creation that requires the user to fill in additional information, such as destination data or metadata, including document type, author, additional data to the document such as dates, addresses, department identification, scan-related metadata such as scan parameters etc. Some of the metadata may be pre-set by the system or in cooperation with the interconnected systems. The scan tasks may be integrated with other third party applications (for example apps on a mobile phone or tablet), such that the scan task can be completed using a third party application.

Figure 9:
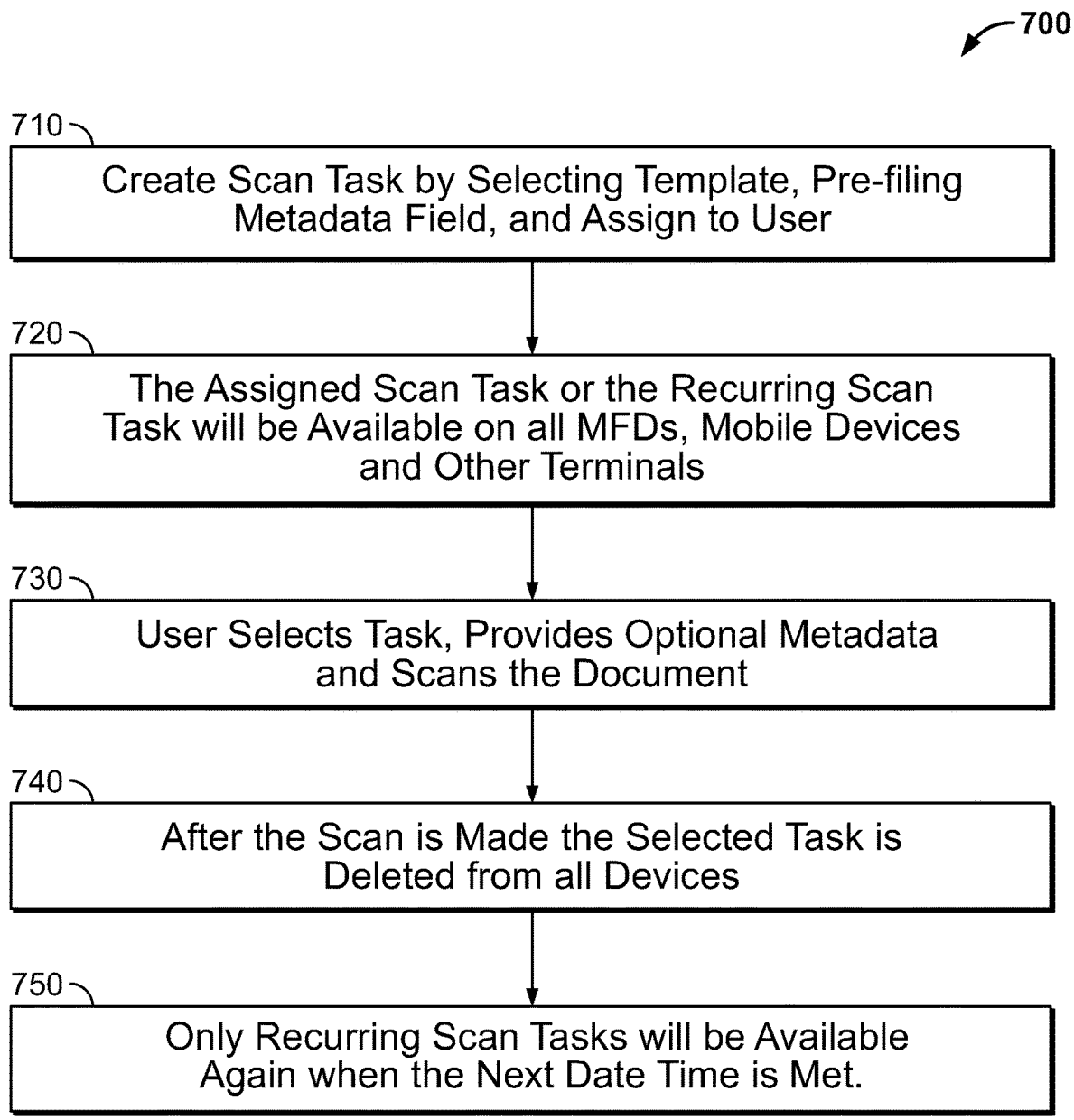
FIG. 9 is a flow chart illustrating a method of creating and performing a scan task.

FIG. 9 is a flow chart 700 illustrating a method of creating and performing a scan task. A third party creates a scan task by selecting an existing template (at 710). The third party may also pre-fill some or all of the meta data fields during this step, and assign the task to a user. The assigned scan task is then made available on all NIFDs, mobile devices, and other terminals (at 720). The scan task is then distributed to the imaging devices on the network and a notification is sent to the user. When a user logs in to an imaging device, the customized scan tasks for that particular user are presented. The user then selects the task, provides any additional meta data, and performs the scan task (at 730). If the scan task is a single, discrete operation, it is then deleted from all devices (at 740). If the scan task is a recurring scan task, it remains on the devices so that it may be performed again (at 750).

In one embodiment, the scan task may include a deadline. For example, the scan may be required within three days. If the scan task is not performed in a timely manner, reminder notifications may be sent to the user. Additionally, notifications may be sent to a supervisor or another person who can provide human intervention (either by performing the task, or instructing the user to perform the task).

After a scan task has been performed, a report or an API call may be generated. The report may include meta data describing the operation that was performed, and information about who, what, when, where, and how the operation was performed. For example, a third party administrator who created the scan task may receive a report that a passport scan was made at a certain time, by a certain person, using a certain imaging device. The report may also include the scan settings and the scan destination that was used and a link to the scanned file or even the scanned file result itself.

Figure 10:
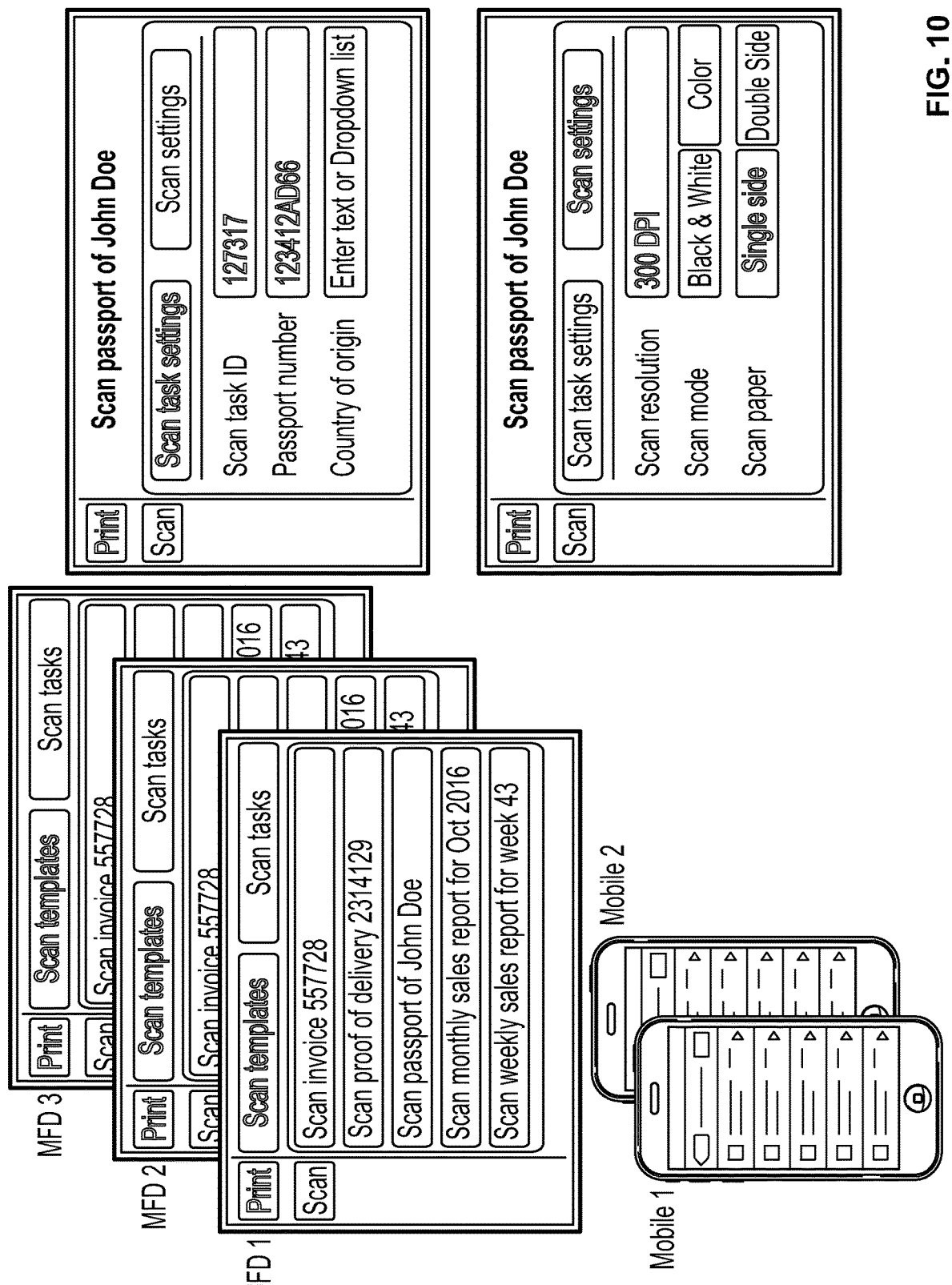
FIG. 10 is a schematic drawing of exemplary user interfaces.

FIG. 10 is a schematic drawing of exemplary user interfaces, including user interfaces on dedicated imaging devices, MFDs, and mobile devices. The user interfaces may show the various scan tasks available to a particular user. The user interface shown in FIG. 10 provides users with an option to select and view pending scan tasks waiting for a user's attention. The user interface further provides options for a user to complete the scan task by using the scan button, see the details of the scan task, fill in the metadata, or return to high-level menus or other menus.

In all of the above-discussed embodiments, the functions disclosed can be achieved through computer code located on a central server in an office, user devices (including mobile phones, tablets, PCs, etc.), scanners, printers, cameras, and multi-function devices. The computer code can be written to a computer readable storage medium such as a CD, USB, hard drives, cloud storage, or any other external or internal storage capable of use by a computer.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A non-transitory computer readable medium encoded with a computer executable instruction performing the following steps:
    defining a scan task for execution by a user on one of a plurality of imaging devices, wherein the scan task includes scan settings and destination settings;
    identifying a particular document for scanning;
    distributing the scan task to each of the plurality of imaging devices upon identifying the particular document for scanning; and
    creating a digital image of a scanned document at one of the plurality of imaging devices according to the scan settings.

2. The computer readable medium of claim 1, wherein the plurality of imaging devices includes at least a first device and a second device, and wherein the step of defining a scan task includes defining a first scan setting associated with the first device and defining a second scan setting associated with the second device, wherein the first scan setting is different from the second scan setting.

3. The computer readable medium of claim 1, further including verifying when a user successfully provides user credentials at one of the plurality of imaging devices.

4. The computer readable medium of claim 1, wherein the computer executable instruction further performs a step of removing the scan task from all imaging devices after a scan task is executed at one imaging device.

5. The computer readable medium of claim 1, wherein the step of distributing the scan task to the plurality of imaging devices causes each of the plurality of imaging devices to request the scan task from a central server.

6. The computer readable medium of claim 1, wherein the step of distributing the scan task to the plurality of imaging devices includes pushing the scan task to each of the plurality of imaging devices from a central server.

7. The computer readable medium of claim 1, wherein the step of distributing the scan task to the plurality of imaging devices includes sending the scan task to the plurality of imaging devices at regular intervals.

8. The computer readable medium of claim 1, wherein the plurality of imaging devices are accessible by a group of users.

9. The computer readable medium of claim 1, wherein the computer executable instruction further performs a step of processing the digital image of the scanned document.

10. A scanning network comprising:
 a central server configured to distribute a scan task, wherein the scan task is associated with a scanning of an identified document;
 a plurality of imaging devices configured to receive and execute a scan task; and
 a storage database configured to receive a document image created from execution of a scan task.

11. The scanning network of claim 10, wherein at least one of the plurality of imaging devices is an interactive device having a display and a camera.

12. The scanning network of claim 11, wherein the interactive device is selected from the group consisting of a mobile telephone, a smart phone, a tablet, a smart watch, a personal computer, a laptop computer, and a kiosk.

13. The scanning network of claim 10, wherein at least one of the plurality of imaging devices is programmed to display a user interface that includes a list of at least two pending scan tasks.

14. The scanning network of claim 10, wherein the scanning network is further configured to perform additional functions and display the additional functions on a user interface of at least one of the plurality of imaging devices.

15. The scanning network of claim 14, wherein the additional functions includes at least one function selected from the group consisting of: scheduling tasks for dates and times in the future, scheduling recurring tasks, creating a document that requires a user to fill in additional information, and integrating scan tasks with third party applications.

16. A method for creating and executing a scan task for a document, the method comprising:
 creating a scan task, the scan task including a scan setting and a scan destination, and the scan task being associated with an identified document;
 sending the scan task to a plurality of user devices;
 receiving a scanned document as a result of a user executing the scan task at a selected one of the plurality of user devices according to the scan settings; and
 saving the scanned document to the scan destination.

17. The method for executing a scan task according to claim 16, wherein the user device is a plurality of user devices, and wherein each of the plurality of user devices receive the scan task.

18. The method for executing a scan task according to claim 17, further including a step of removing the scan task from all user devices after receiving the scanned document.

19. The method for executing a scan task according to claim 16, further including a step of validating the scanned document against required input, wherein the step of validating includes comparing pre-filled metadata to received data.

* * * * *